(12) United States Patent
Metz et al.

(10) Patent No.: US 10,668,913 B2
(45) Date of Patent: *Jun. 2, 2020

(54) LOADING DOCK WHEEL CHOCK SYSTEM

(71) Applicant: DL Manufacturing, Inc., North Sysracuse, NY (US)

(72) Inventors: Donald L. Metz, Kirkville, NY (US); Joshua L. Eppley, Sackets Harbor, NY (US)

(73) Assignee: DL Manufacturing, Inc., North Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,232

(22) Filed: Jan. 9, 2017

(65) Prior Publication Data
US 2017/0144645 A1   May 25, 2017

Related U.S. Application Data

(63) Continuation of application No. 14/869,976, filed on Sep. 29, 2015, now Pat. No. 9,539,995.

(60) Provisional application No. 62/056,849, filed on Sep. 29, 2014.

(51) Int. Cl.
| B60T 17/22 | (2006.01) |
| B60T 3/00 | (2006.01) |
| H04N 7/18 | (2006.01) |
| H04W 84/12 | (2009.01) |

(52) U.S. Cl.
CPC ............. B60T 17/22 (2013.01); B60T 3/00 (2013.01); *H04N 7/183* (2013.01); *H04W 84/12* (2013.01)

(58) Field of Classification Search
CPC ......... B60T 3/00; B60T 17/22; B65G 69/003; B65G 69/005; B65G 69/006
USPC ................. 188/4 R, 32, 36; 410/30; 414/401
See application file for complete search history.

(56) References Cited

U.S. PATENT DOCUMENTS

| 6,336,527 | B1 * | 1/2002 | Metz | B60T 3/00 188/32 |
| 9,539,995 | B2 * | 1/2017 | Metz | B60T 17/22 |
| 9,751,702 | B1 * | 9/2017 | Hoofard | B65G 69/005 |
| 2009/0026022 | A1 * | 1/2009 | Andersen | B60T 3/00 188/32 |
| 2010/0260586 | A1 * | 10/2010 | Manone | B65G 69/005 414/401 |
| 2011/0226565 | A1 * | 9/2011 | Jette | B60T 3/00 188/32 |
| 2011/0290596 | A1 * | 12/2011 | Perkins | B60T 3/00 188/32 |

(Continued)

*Primary Examiner* — Christopher P Schwartz
(74) *Attorney, Agent, or Firm* — Barry F. Manna

(57) ABSTRACT

A wheel chock system includes a chock, a sensor disposed within the chock to sense the proximity to the tire, an outside light box, and an inside control panel. Lamps on the outside light box provide a visual indication as to when the chock is in close proximity to the wheel. Lights on the inside control panel provide a visual indication of the loading dock safety status. The wheel chock system further includes a controller coupled to the inside control panel, programmed to change visual indications of both the outside light signal box and the inside control panel, based at least on the sensor and a loading dock door sensor. The wheel chock system further includes a camera positioned to view the tire and the chock and convey an image of the tire and the chock to a display on or near the inside control panel.

17 Claims, 8 Drawing Sheets

(56) References Cited

U.S. PATENT DOCUMENTS

| | | | | |
|---|---|---|---|---|
| 2012/0006632 A1* | 1/2012 | Nelson | ............ | B60T 3/00 |
| | | | | 188/32 |
| 2013/0280003 A1* | 10/2013 | Wessel | ............ | B60P 3/077 |
| | | | | 410/30 |
| 2013/0317711 A1* | 11/2013 | Plante | ............ | G07C 5/008 |
| | | | | 701/51 |
| 2015/0239686 A1* | 8/2015 | Stone | ............ | B65G 69/003 |
| | | | | 414/401 |
| 2016/0114745 A1* | 4/2016 | Ricci | ............ | H04W 12/06 |
| | | | | 701/2 |
| 2017/0369260 A1* | 12/2017 | Hoofard | ............ | B60T 3/00 |

* cited by examiner

CHOCK PROPER PLACEMENT: SIDE VIEW

CHOCK PROPER PLACEMENT: TOP VIEW

CHOCK WRONG PLACEMENT: TOP VIEW

CHOCK WRONG PLACEMENT: TOP VIEW

LOADING DOCK WHEEL CHOCK SYSTEM

CROSS REFERENCE TO RELATED APPLICATIONS

This application is a continuation of, and claims the benefit and priority of, U.S. patent application Ser. No. 14/869,976, filed on Sep. 29, 2015, and entitled SYSTEM FOR IMPROVING PERFORMANCE OF WHEEL CHOCK SAFETY PROCEDURES, which is a non-provisional application claiming priority benefit from U.S. Provisional Application Ser. No. 62/056,849, filed Sep. 29, 2014, entitled SYSTEM AND METHOD FOR IMPROVING PERFORMANCE OF WHEEL CHOCK SAFETY PROCEDURES, which applications are incorporated herein in their entirety by reference.

BACKGROUND OF THE INVENTION

The application relates to loading docks and particularly to a system and method for improving performance of loading dock wheel chock safety procedures.

Loading docks are among the most dangerous locations in a commercial space. Tractor trailer trucks need to maneuver outside the loading dock with limited space and limited visibility. Inside, fork lift trucks are moving about to and from the loading dock, also with limited space and limited visibility. Pedestrians can also be moving about both outside and inside the loading dock door.

One of the worst case accident scenarios at a loading dock can occur when a trailer unexpectedly moves away from the dock. If a forklift is between a surface of the dock and the entry to the trailer when the trailer unexpectedly moves, in almost all cases the forklift falls about four feet to the surface below the door. The forklift operator can be seriously injured, or worse, a portion of the forklift can fall on the driver causing in a fatal crush injury.

In response to such accidents, there are chock related OSHA regulations, as well as local regulations, and commercial rules regarding chock use at loading docks.

BRIEF SUMMARY OF THE INVENTION

In accordance with one aspect of the disclosure, a wheel chock system includes a chock assembly comprising a wheel chock, a shaft, and a handle coupled to the wheel chock to place the chock against a tire of a truck or trailer wheel. A sensor disposed within the chock senses when the chock is in close proximity to the tire. The wheel chock system further includes an outside light box electrically coupled to the chock assembly. One or more lamps of the outside light box provide a visual indication of the proximity to the wheel based on the sensor, and to give one or more visual indications of a loading dock safety status. The wheel chock system further includes an inside control panel operatively coupled to the outside light box. One or more lights on the inside control panel provide a second visual indication of the loading dock safety status. The wheel chock system further includes a controller electrically coupled to the inside control panel. The controller includes a processor programmed to change visual indications of both the outside light box and the inside control panel, based at least on the sensor and a loading dock door sensor. The wheel chock system further includes a wireless module communicatively coupled to the controller to convey the loading dock safety status wirelessly over a network to provide an additional layer of wheel chock system safety oversight.

In accordance with one another aspect of the disclosure, a wheel chock system includes a chock assembly comprising a wheel chock, a shaft, and a handle coupled to the wheel chock to place the chock against a tire of a truck or trailer wheel. The wheel chock system further includes a sensor disposed within the chock to sense when the chock is in close proximity to the tire. The wheel chock system further includes an outside light box electrically coupled to the chock assembly. One or more lamps on the outside light box provide a visual indication of the proximity to the wheel based on the sensor and to give one or more visual indications of a loading dock safety status. The wheel chock system further includes an inside control panel operatively coupled to the outside light box. One or more lights on the inside control panel provide another visual indication of the loading dock safety status. The wheel chock system further includes a controller electrically coupled to the inside control panel. The controller includes a processor programmed to change visual indications of both the outside light signal box and the inside control panel, based at least on the sensor and a loading dock door sensor. The wheel chock system further includes a camera positioned to view the tire of the truck or trailer wheel and the chock. The camera is communicatively coupled to the wheel chock system to convey an image of the tire of the truck or trailer wheel and the chock to a display disposed on or near the inside control and light box to provide an additional layer of wheel chock system safety oversight.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
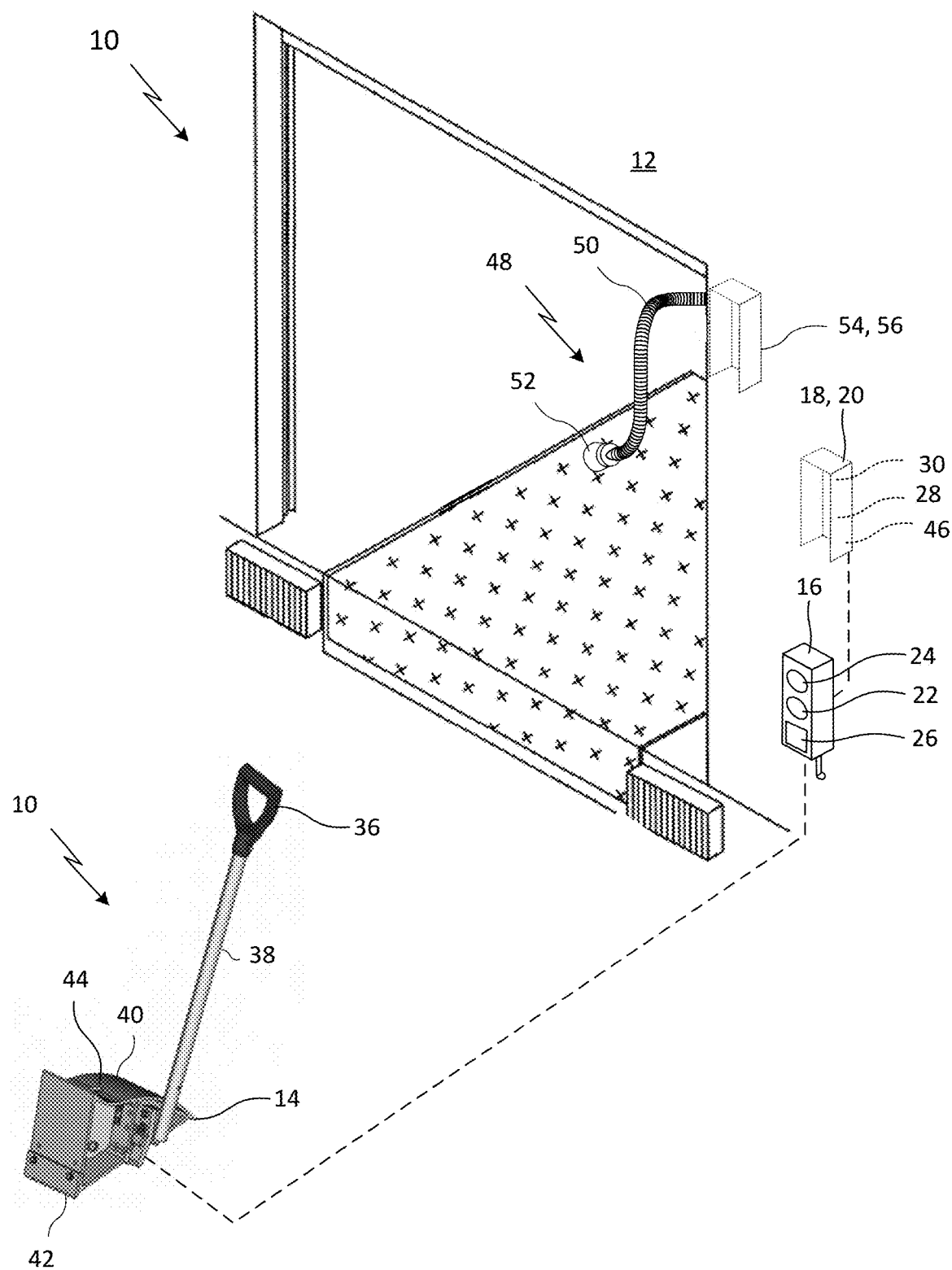
FIG. 1 depicts an illustration of a wheel chock system as viewed from the truck side of a loading dock, according to one embodiment of the invention.

Definitions: Wireless module: A wireless module includes any suitable form of wireless communications such as, for example, Wi-Fi, ZigBee, XBee, communication over power lines, or any other suitable form of wireless communications, such as any suitable type of radio frequency (RF) wireless communications. While referred to hereinbelow as a wireless "module", wireless module is understood to include wireless functionality added by one or more wires, PC posts, or cables literally connected to a wireless module, as well as the equivalent wireless functionality on any suitable circuit board, such as can be provided by one or more discrete components and/or integrated and/or hybrid circuits mounted to one or more circuit boards associated with a controller. The method of construction such as, for example, through hole components, surface mount components, and or more compact technologies such as flip chips and/or other solder bump compatible packages are all understood to fall within the definition of wireless module as used hereinbelow.

Operatively coupled: Operatively coupled as used herein includes both wired and wireless connectivity such as any suitable form of communicatively coupled. For example, in practice, the "outside light box" is typically wired by a cable through a wall to an "inside light box" as described hereinbelow. However, it is unimportant to the new system and method how the outside box is operatively coupled to the system, typically receiving information from a controller which can be mounted inside the inside light box for convenience of packaging or in another enclosure, typically inside of the building, and typically mounted near the inside light box. For convenience of supplying power to the outside light box, the outside light box, again is typically hardwired to either the inside light box or another related electronics enclosure typically housing the controller electronics and ancillary contact devices, such as, for example electro-mechanical relays, or solid state switches used to control one or more series of lamps (e.g., a string of LEDs) in each of the light boxes. However, there can be embodiments, for example, where an outside light box receives power from an electrical power source independent of electrical power which powers the inside light box and/or the controller mounted inside of the loading dock. In such cases, it is contemplated that the outside light box can be wirelessly coupled to the controller (which may or may not be physically mounted in the inside light box) by any suitable wireless means, such as, for example, those used for the wireless module as described herein. A wirelessly coupled outside light box can be powered by any suitable means, such as, for example by one or more batteries of any suitable type (e.g., as charged by a local dedicated or non-dedicated photovoltaic panel and battery charger) or hardwired into any suitable source of AC power or DC power available outside of the loading dock near where the outside light box is mounted to the outside loading dock wall.

As described hereinabove, loading docks are among the most dangerous locations in a commercial space. Tractor trailer trucks need to maneuver outside the loading dock with limited space and limited visibility. Inside, fork lift trucks are moving about to and from the loading dock, also with limited space and limited visibility. Pedestrians can also be moving about both outside and inside the loading dock door.

One of the worst case accident scenarios at a loading dock can occur when a trailer unexpectedly moves away from the dock. If a forklift is between a surface of the dock and the entry to the trailer when the trailer unexpectedly moves, in almost all cases the forklift falls about four feet to the surface below the door. The forklift operator can be seriously injured, or worse, a portion of the forklift can fall on the driver causing in a fatal crush injury.

While, there are chock related OSHA regulations, as well as local regulations, and commercial rules regarding chock use at loading docks, such accidents still happen.

Much progress has been made towards improving loading dock safety. For example, through a combination of signal lights, audio alarms, and interlocks, the Smart Chock™ brand sensor system (available from DL Manufacturing of North Syracuse, N.Y.) has been widely used to enforce safe chock practice. However, even with the extensive use of the local signaling and alarming offered by the Smart Chock™ sensor system, a system and method which offers still more oversight and/or better enforcement of proper chock use and chock procedure at the loading dock is needed.

Furthermore, in facilities having a large number a loading docks, a logistics problem arose when engineers attempted to integrate wired wheel chock sensor input from numerous wheel chocks. Specifically, the system had to be "daisy-chained," meaning each unit was tied to another in series, and the wheel chock sensor signals passed from one device to the next before finally arriving at an end interface. This scheme became prohibitive in terms of installation complexity and hardware costs when incorporating large numbers of units. The cost of running wires was unmanageable due to each facility's particular layout and floorplan—may had crowded and difficult-to-install areas that prevented running the large numbers of wires required to operate the system.

FIG. 1 shows an illustration of one exemplary embodiment of a wheel chock system 10 as viewed from the truck side of a loading dock 12. The wheel chock system 10 includes a wheel chock assembly 14, an exterior-mounted outside light box 16, an interior-mounted inside control panel 18 (shown in dashed lines because it is located on the other side of the loading dock wall), and a controller 20. In the illustrated embodiment, the controller 20 is disposed inside the inside control panel 18. The outside light box 16 includes a green lamp 22, a red lamp 24, and a red chock icon 26. The inside control panel 18 includes a green chocked lamp 28 and a red unchocked lamp 30.

In operation, as a driver backs up to a closed overhead door, the green lamp 22 flashes on the outside light box 16, indicating it is safe to proceed. A light baffle around the red and green lamps (typically high-brightness LEDs) cause the lights to be visible only to the driver in the cab of a truck in the lane corresponding to a particular loading dock. Concurrently, the inside control panel 18 illuminates the red unchocked lamp 30, indicating the trailer is not chocked and it may be unsafe to open the overhead door.

Figure 2:
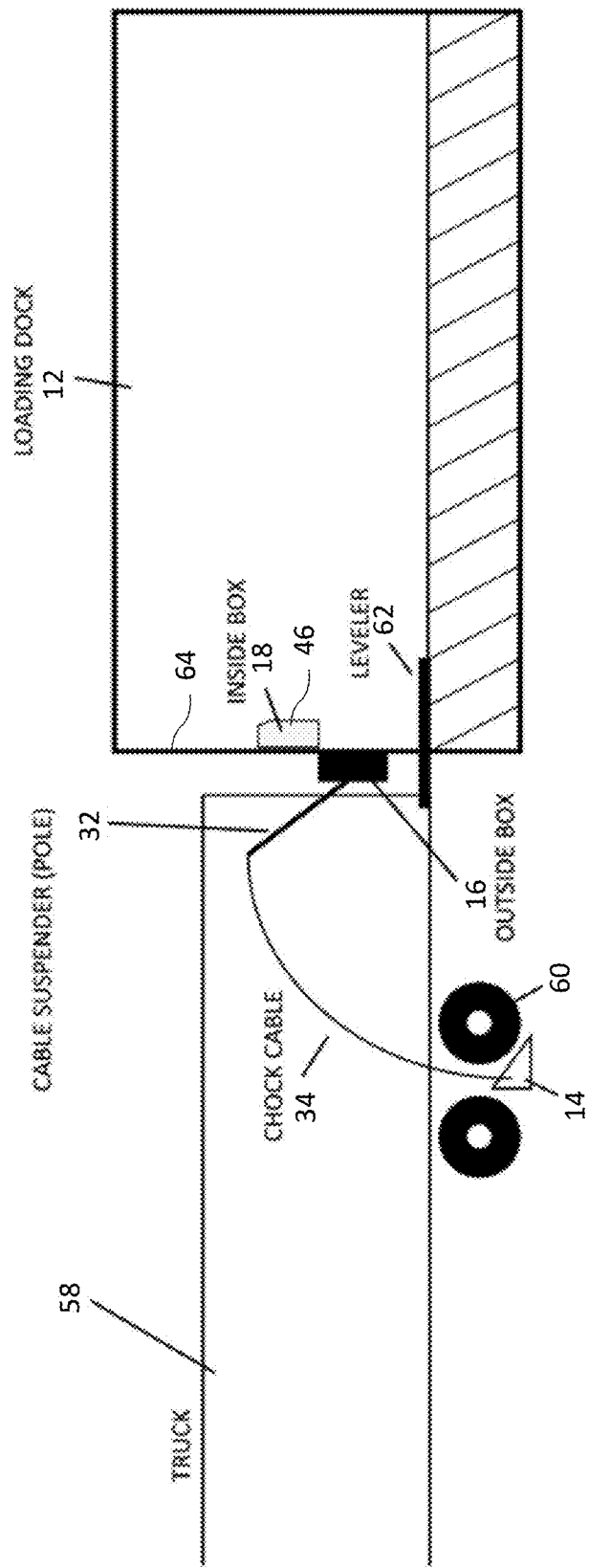
FIG. 2 depicts a schematic diagram illustrating a truck trailer backed up to loading dock.

After backing into the loading dock 12, the driver locates the wheel chock assembly 14, which can only be moved within a distance of that loading dock as set by the cable length. A cable pole 32, such as a fiberglass pole, helps to keep the cable 34 off the ground and out of the way when the wheel chock assembly 14 is not in use (FIG. 2). The driver can take hold of the wheel chock assembly 14 by a handle 36 at the end of a shaft 38, such as a fiberglass shaft. The driver then follows safe wheel chock procedure and places the wheel chock 40 under the truck tire (not shown). In some embodiments, a non-skid saw tooth back plate 42 helps to positively secure the chock back foot to the ground surface.

A sensor 44 may be operatively associated with the wheel chock system 10 to detect the presence of the chocked tire. In one possible implementation, the contact surface of the wheel chock 40 defines an aperture, and the sensor 44 is adapted to measure the presence of the truck tire through the aperture. The sensor 44 may be any type of data-gathering, data-transmitting device that is suitable for the conditions. In one example, the sensor 44 may be an ultrasonic device that includes an ultrasonic transducer or transceiver adapted to generate high frequency sound waves and evaluate the echo which is received back by the sensor. By measuring the time interval between sending the signal and receiving the echo, the sensor can determine if a truck tire is present over the aperture. In another example, the sensor 44 may be a proximity-sensing photoelectric sensor in which an emitter is adapted to transmit a beam of light (such as pulsed infrared, visible red, or laser) that diffuses through the aperture. As the wheel covers the aperture, part of the light beam deflects back to a receiver, detection occurs, and an output may be transmitted to a controller or microprocessor.

When the trailer is parked and chocked, the sensor 44 in the wheel chock 40 relays the condition to the controller 20, which sends a command to illuminate the chock icon 26 and turn off the green lamp 22 on the outside light box 16. With the outside red chock icon 26 illuminated, a driver checking the rear view mirror can positively see that the trailer wheel is still chocked. Concurrently, the red unchocked lamp 30 turns off and the green chocked lamp 28 illuminates on the inside control panel 18, indicating the trailer is chocked and it is safe to open the overhead door. The inside control panel 18 is typically mounted to an inside wall in the immediate vicinity of a loading dock door (e.g., a sectional door) of the same loading dock, such as for example, by fasteners. The inside control panel 18 also may include an audio alarm 46 for alerting personnel to unsafe conditions as described in more detail hereinbelow.

FIG. 1 also depicts an exemplary trailer illumination lamp 48 having a flexible, adjustable shaft 50 to provide lighting inside the trailer for loading and unloading operations. After the loading dock door is opened, the adjustable shaft 50 may be positioned to point the lamp bulb (encased by bulb shield 52) into the trailer. In some embodiments, the adjustable shaft 50 may be formed of flexible stainless steel tube, and a cooling fan 54 located in a base housing 56 may push air through the flexible stainless steel tube to reduce the lamp bulb temperature, thereby extending the bulb service life. The base housing 56 may be mounted to an inside wall so as to prevent blocking the doorway. The illumination lamp 48 can also be used to supplement alarm signals, such as by blinking on and off.

FIG. 2 depicts a schematic block diagram showing a truck trailer 58 backed up to the loading dock 12. The trailer 58 has been properly chocked by wheel chock assembly 14 placed against wheel 60. Typically, a loading dock sectional door is opened, followed by operation of a loading dock leveler 62 to make a relatively flat bridge for personnel and forklifts to proceed to and from the loading dock to and from the trailer. Once the leveler is correctly positioned, a personal safety restraint, such as a chain across the loading dock door can be opened and loading or unloading operations can then safely proceed. Once the loading dock door has opened, the red lamp 24 on outside light box 16 illuminates to alert those outside in the same loading dock lane that the loading dock door is open.

Because loading dock operations can involve potentially dangerous activities, many embodiments of the exemplary wheel chock system 10 include various responses to the wheel chock sensor 44, a door sensor 64, and a safety chain sensor 66 (not shown) to automatically sense safety conditions and to alarm on detection of a unsafe loading dock condition. In one example, the outside light box 16 may include an audio alarm 46 for sounding during unsafe conditions as described in more detail hereinbelow. In another example, if wheel chock 40 is removed prematurely with the loading dock door open, the green chocked lamp 28 on the inside control panel 18 turns off, the red unchocked lamp 30 turns on, and an outside audio alarm 46 turns on. In yet another example, if the loading dock door opens without a truck wheel chocked, the illumination lamp 48 flashes and the inside audible alarm 46 sounds. Additionally, the outside red chock icon 26 turns off, the outside red lamp 24 illuminates, and an outside audio alarm 46 activates. In one exemplary system failure mode, if communication between the wheel chock assembly 14 and the inside control panel 18 is severed, lost, or disconnected, such as by severing chock cable 34, the inside green chocked lamp 28 and red unchocked lamp 30 alternately flash from green to red, an on-board yellow system LED (not shown) illuminates, and the outside red lamp 24 illuminates. If the wheel was chocked, chock icon 26 turns off and outside audio alarm 46 sounds.

As can now be seen, the various lights and alarms of the exemplary smart wheel chock system are intended to guide the truck driver and personnel at the loading dock through a safe loading dock chock operation, including adherence to safe wheel chock procedures. When the smart wheel chock system detects a breach of the loading dock safety procedures or other safety hazard, the smart wheel chock system attempts to draw the attention of any personnel in the immediate location of the loading dock to an unsafe condition.

However, it has been realized that despite the numerous safety features described hereinabove, it may still be possible for personnel at the loading dock to defeat one or more interlocks or to defeat proper chocking such as, for example, by intentionally or accidentally causing wheel chock assembly 14 to indicate that it is correctly installed under a truck tire when it is not. While almost no commercial system can guarantee a perfectly failsafe operation, loading dock operations can be so hazardous and fast paced, it was realized that further levels of system safety monitoring are needed.

Figure 3:
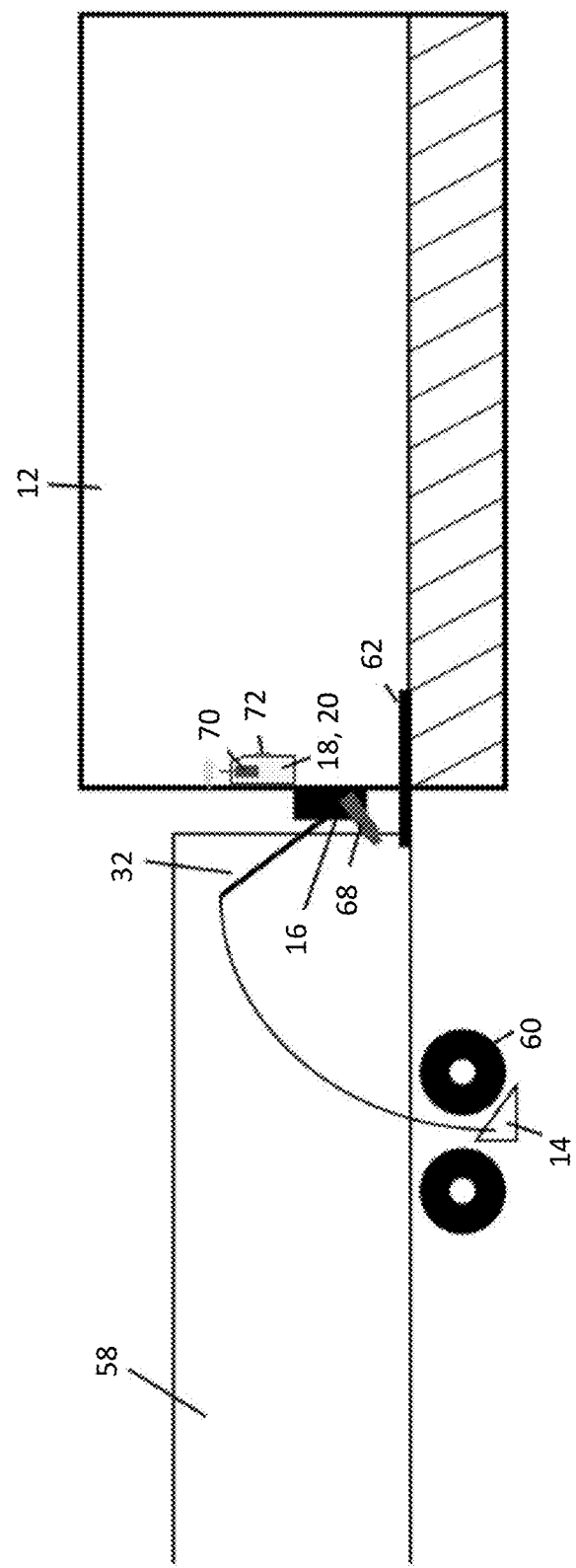
FIG. 3 depicts a block diagram illustrating a truck trailer backed up to loading dock having a camera directed at the wheel chock and which shows a Wi-Fi module of an exemplary Wi-Fi smart wheel chock system.

FIG. 3 depicts a schematic block diagram of a truck trailer 58 backed up to loading dock 12 having a camera 68 pointed at the wheel chock 40 and which shows a wireless module 70 of an exemplary Wi-Fi smart wheel chock system. The wireless module 70, which may be a Wi-Fi module, is communicatively coupled to inside control panel 18 by any suitable means, such as for example, via a serial connection such as by a RS/EIA/TIA-232 or RS/EIA/TIA-485 serial connection interface. An optional LCD display 72, here provided as part of the inside control panel 18, allows an operator to see the image from camera 68 and/or to read smart wheel chock system information directly at the loading dock.

The Wi-Fi portion of a smart wheel chock system allows for safety personnel to be able to actively monitor events on the loading dock, while not having to be physically present at the loading dock. Now, persons beyond the loading dock are able to access the loading dock information available from the smart wheel chock system of every loading dock door from any remote location with access to the Wi-Fi network in, such as, for example, via the Internet.

In one example, a worker opens a loading dock door to load a truck without the truck being properly chocked. The result is an alarm sounding as well as the safety personnel being wireless notified by any suitable means, such as, for example via their computer and/or smartphone and/or other suitable mobile device.

Along with enhanced safety, there can also be energy savings and environmental awareness by the addition of the wireless smart wheel chock system reporting features. For example, there can be energy conservation and monitoring by only allowing the loading dock Fan and Light to be on when the loading dock door is open through wired or wireless control means (e.g., wireless power control modules).

In another example, large facilities with a high number loading dock doors may desire to conserve as much energy as possible. With the smart wheel chock system monitoring system, users are able to monitor the time duration of light and/or fan operation and thus determine an approximate amount of power usage. Remote users can determine if the loading docks are consuming more power than intended by remote monitoring and take action to change the loading dock operation to better meet desired energy usage goals.

The monitoring system may also record occurrence times and calculate the time between events to obtain efficiency metrics. In one example, a large facility desires to increase the efficiency of loading dock times as much as possible. A user of the Wi-Fi smart wheel chock system and method as described herein is able to monitor, record, and study loading dock operation information as can be transmitted from the loading dock.

Because the loading dock is an entry portal into a commercial facility, loading dock information sent by the Wi-Fi smart wheel chock system and method as described herein (e.g., a door open event) can be used to enhance facility security monitoring. In one example, a particular company normally operates its loading dock only during regular business hours. A wireless communication from the smart wheel chock system indicates that a door has been opened during a time outside of normal operating hours. The monitoring system can also be set to specifically alert security personnel of loading dock events during a particular time period (e.g., outside of normal working hours) via text message/email/other to provide enhanced loading dock security.

The controller 20 can be communicatively coupled to the wireless module 70 by any suitable means. In some embodiments, smart wheel chocks can be coupled to the wireless module by a RS/EIA/TIA-232 or a RS/EIA/TIA-485 serial connection interface.

In one implementation, each smart wheel chock system 10 can be assigned a unique IP address. The IP address can be coded for a corresponding loading dock location. For example, a "loading dock 47" might be assigned the IP address 10.24.70.047 and a "loading dock 48" assigned an IP address of 10.24.70.048. The IP address can be entered into the Wi-Fi module 70 of a smart wheel chock system by any suitable IP address entry technique. For example, in embodiments with a touch sensitive LCD display 72, or where there is a local keypad or keyboard, the IP address can be entered via the LCD display. The IP address can be set by a portable computer temporarily connected to the wireless module, such as through the RS-232 port on the conversion module. Or, in some embodiments, the IP address can be set or set wirelessly by accessing the RS-232 to Wi-Fi converter via a network access point (similar to configuring a router).

In some embodiments, the smart wheel chock system 10 can send wireless messages, such as wireless messages sent by a Wi-Fi module. Exemplary Wi-Fi smart wheel chock system messages—wireless (e.g., Wi-Fi) smart wheel chock system messages can be sent using any suitable characters or encoding. Exemplary messages include "CHOCKED", "DOOR MOVING", "DOOR OPEN", "DOOR CLOSED", "UNCHOCKED", etc. Typically, unique names or codes are assigned to each message. For example, the message "CHOCKED" can be ":CHKD!". The same message can be sent, for example, as an ASCII code, a HEX code, a binary code, or by any other suitable encoding method. There can be a character which announces a message, such as, for example ":". There can also be a character to indicate the end of a message, such as, for example, "!". The exact coding or format of a wireless smart wheel chock system message is unimportant to the system and method described herein. It is also unimportant if the actual coded message literally include letters representing a physical item. For example, the system can be configured to recognize the message ":2;T!" as meaning door moving.

Typically, an application program, such as, for example, any suitable executable code may be running on a computer or device intended to receive such wireless smart wheel chock system messages. In some embodiments, there can be two-way messaging, where, for example, a supervisor realizing an unsafe loading dock condition from received messages or other indication received at the remote location (e.g., an image as described hereinbelow), can stop or inhibit some or all loading dock functions by use of a remote computer or a remote mobile device.

Figure 4:
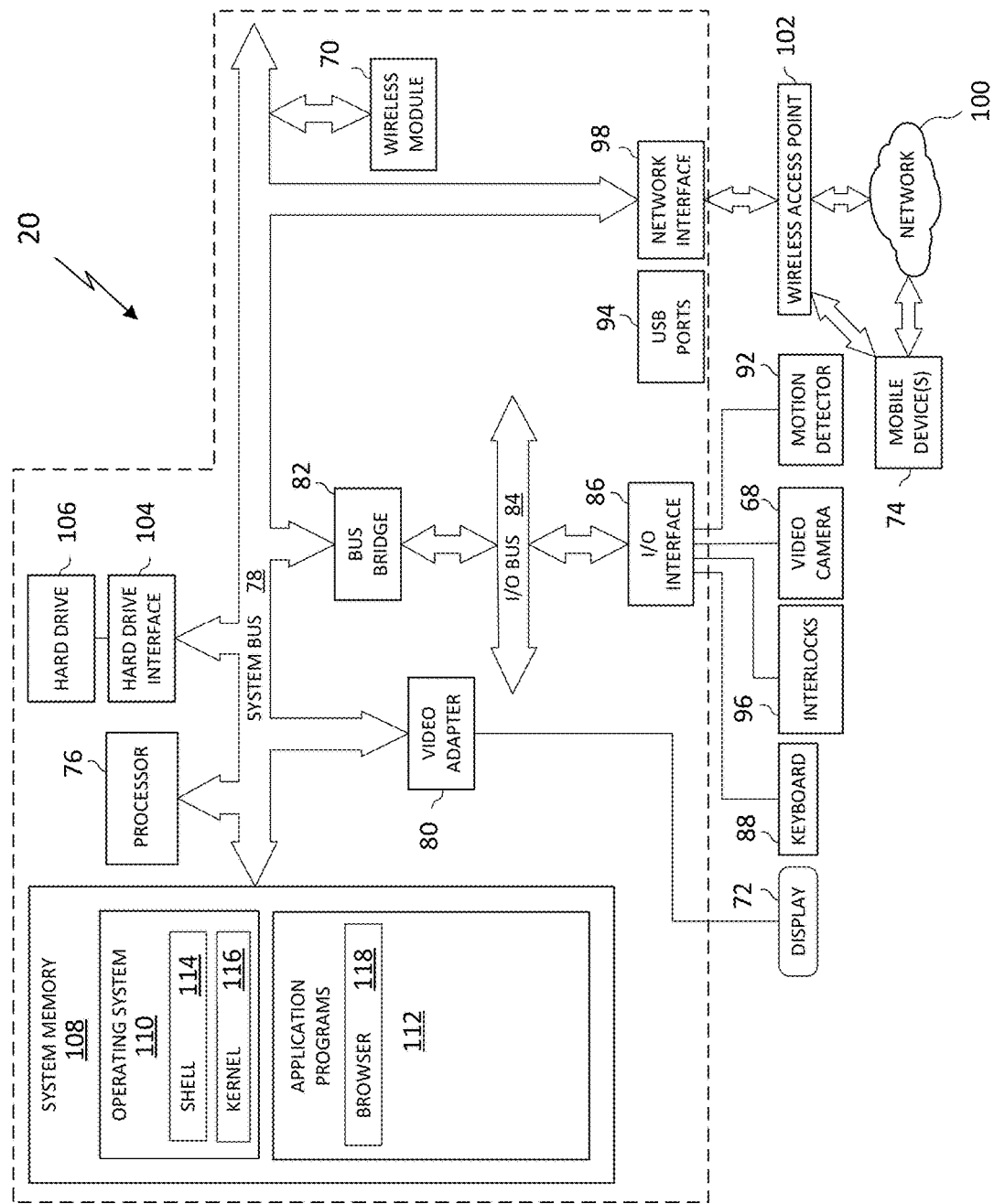
FIG. 4 depicts an exemplary system and network which may be used to implement the present invention.

FIG. 4 schematically depicts a block diagram of an exemplary controller 20 and network that may be utilized by and/or in the implementation of the present invention. Note that some or all of the exemplary architecture, including both depicted hardware and software, shown for and within controller 20 may be utilized by mobile devices 74. Note that in one embodiment, mobile device(s) 74 are mobile devices with the ability to connect to the Internet. Examples of such mobile devices include, but are not limited to, "smart" phones, personal digital assistants (PDAs), laptop computers, tablet computers, etc. Further note that the illustrated controller 20 is exemplary in nature, and embodiments thereof may include fewer components than illustrated in FIG. 4. For example, controller 20 may comprise a microcontroller with somewhat limited functions and capabilities.

Exemplary controller 20 includes a processor 76 that is coupled to a system bus 78. Processor 76 may utilize one or more processors, each of which has one or more processor cores. A video adapter 80, which drives/supports the display 72, is also coupled to system bus 78. System bus 78 is coupled via a bus bridge 82 to an input/output (I/O) bus 84. An I/O interface 86 is coupled to I/O bus 84, and affords communication with various I/O devices, including for example a keyboard 88, a video camera 90, a motion detector 92, external USB ports 94, and various interlocks 96 that may be activated when pre-set conditions are satisfied. Exemplary interlocks 96 include commands to illuminate the lamps or indicators in the outside light box 16 and the inside control panel 18. While the format of the ports connected to I/O interface 86 may be any known to those skilled in the art of computer architecture, in one embodiment some or all of these ports are universal serial bus (USB) ports.

As depicted, controller 20 is able to communicate with mobile devices 74 using a network interface 98 that accesses a network 100. Network interface 98 may be a hardware network interface, such as a network interface card (NIC), etc. network 100 may be an external network such as the Internet, or an internal network such as an Ethernet or a virtual private network (VPN). In one embodiment, access to the network 100 is via a wireless access point 102, which is a wireless modem that allows devices that are compliant with a wireless protocol (e.g., IEEE 802.11x—"Wi-Fi") to wirelessly access network 100. Note that wireless access point 102 affords mobile devices 74 access to network 100 (e.g., the Internet), and also affords the controller 20 direct access to the mobile devices 74.

Other examples of the wireless network depicted by network 100 include, but are not limited to, a near field communication (NFC) network (in which devices communicate at ranges of 4 cm or less); personal area networks (PANs), such as those that use industrial, scientific, and medical (ISM) radio bands and protocols defined in the Institute of Electrical and Electronics Engineers (IEEE) 802.15.1 standard for wireless communications within a few meters; as well as a wireless local area network (WLAN), such as a Wi-Fi network, which enables wireless communication in a range of approximately 100 meters in accordance with the IEEE 802.11x standards.

The controller 20 may include a hard drive interface 104 coupled to system bus 78. The hard drive interface 104 may interface with a hard drive 106 or like storage device. In one embodiment, hard drive 106 populates a system memory 108, which is also coupled to system bus 78. The system memory 108 is defined as a lowest level of volatile memory in the controller 20. This volatile memory includes additional higher levels of volatile memory (not shown), including, but not limited to, cache memory, registers and buffers. Data that populates system memory 108 includes the controller's operating system (OS) 110 and application programs 112.

OS 110 may include a shell 114 for providing transparent user access to resources such as application programs 112. Generally, shell 114 is a program that provides an interpreter and an interface between the user and the operating system. More specifically, shell 114 executes commands that are entered into a command line user interface or from a file. Thus, shell 114, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 116) for processing. Note that while shell 114 may be a text-based, line-oriented user interface, the present invention will equally well support other user interface modes, such as graphical, voice, gestural, etc.

As depicted, OS 110, including kernel 116, may include lower levels of functionality for OS 110, including providing essential services required by other parts of OS 110 and application programs 112, including memory management, process and task management, disk management, and mouse and keyboard management. Application programs 112 may include a renderer, shown in exemplary manner as a browser 118, which includes program modules and instructions enabling a world wide web (WWW) client to send and receive network messages to the Internet using hypertext transfer protocol (HTTP) messaging, thus enabling communication with other computer systems such as mobile devices 74.

Application programs 112 in the controller's system memory may also include programs and logic to initiate the interlock features of the wheel chock system 10.

Note that the hardware elements depicted in controller 20 are not intended to be exhaustive, but rather are representative of typical components which may be required by various embodiments of the present invention. For instance, controller 20 may include alternate memory storage devices such as magnetic cassettes, digital versatile disks (DVDs), Bernoulli cartridges, and the like. These and other variations are intended to be within the spirit and scope of the present invention.

Figure 5:
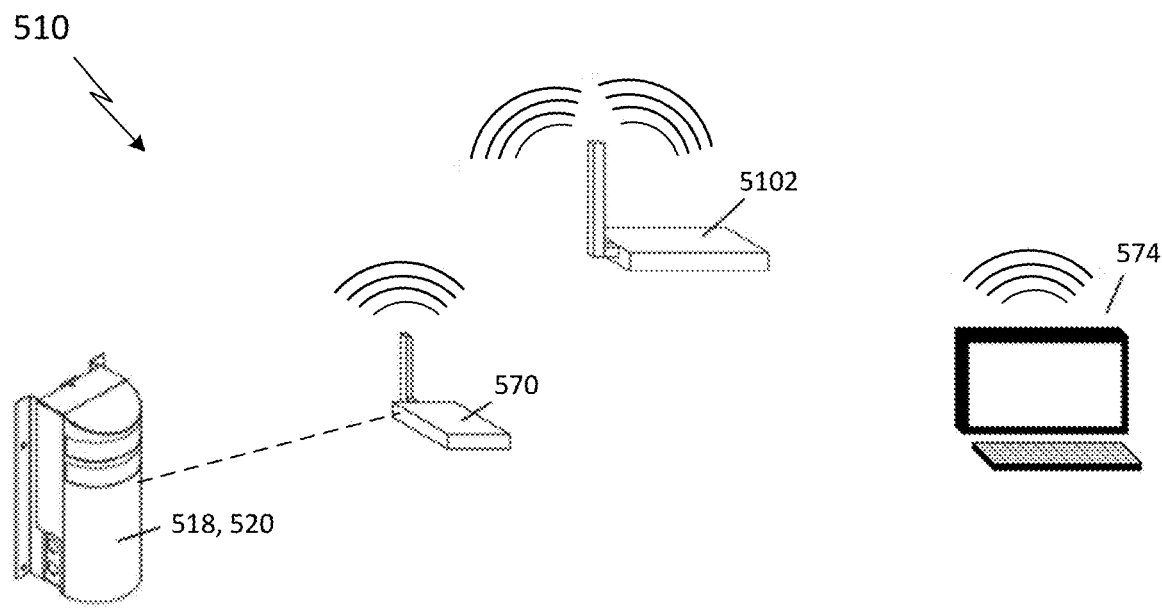
FIG. 5 depicts a block diagram of an exemplary Wi-Fi smart wheel chock system configuration where a computer with a Wi-Fi connection to a local network can communicate via an access point with a smart wheel chock system.

FIG. 5 depicts a block diagram of an exemplary Wi-Fi smart wheel chock system 510 configuration where a computer 574, such as a laptop, personal computer, or mobile device, having a Wi-Fi connection to a local network can communicate via an access point to receive smart wheel chock system information. The inside control panel 518 is communicatively coupled to a wireless module 570, such as a Wi-Fi module, by a RS/EIA/TIA-232 or a RS/EIA/TIA-485 serial connection interface. The Wi-Fi module 570 can be mounted to the inside control panel 518, to the wheel chock assembly 514, or at any other suitable exterior or interior location. Typically Wi-Fi module 570 is mounted near or within the inside control panel 518, which can also house the controller 520. In the embodiment of FIG. 5, Wi-Fi module 570 communicates smart wheel chock system information via a local Wi-Fi network wireless point, such as, for example Wi-Fi wireless access point 5102. Any suitable computer 574 can communicate via Wi-Fi with the local Wi-Fi network to receive smart wheel chock system information from Wi-Fi module 570.

Figure 6:
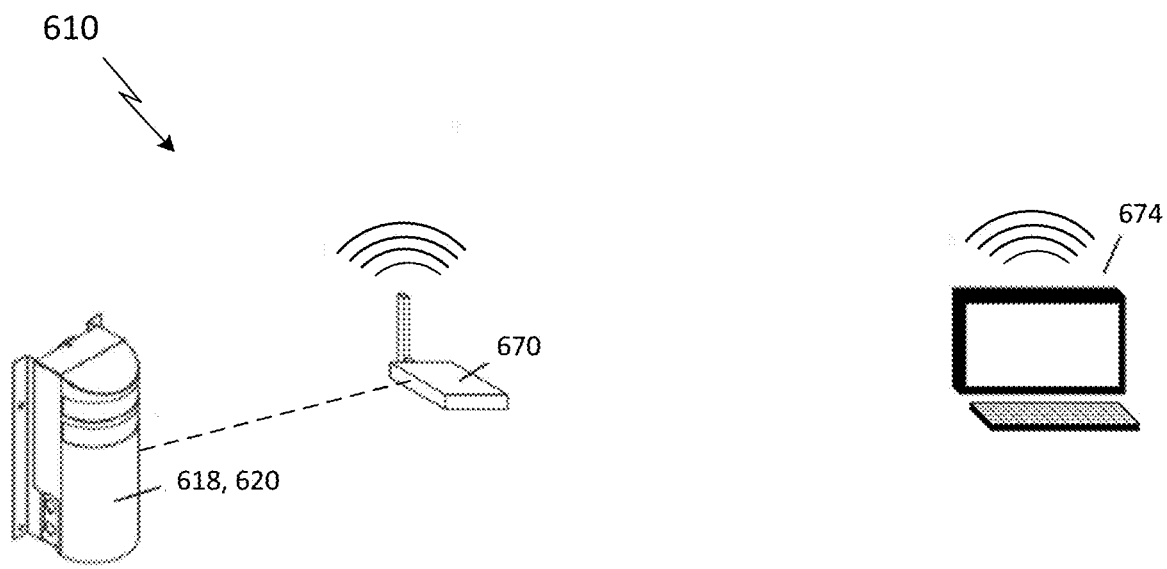
FIG. 6 depicts a block diagram of an exemplary Wi-Fi smart wheel chock system configuration where a computer with a Wi-Fi module can communicate directly with the Wi-Fi module of a smart wheel chock system.

FIG. 6 depicts a block diagram of an exemplary Wi-Fi smart wheel chock system 610 configuration where a computer with a Wi-Fi module can communicate directly with the Wi-Fi module of a smart wheel chock system 610 to receive smart wheel chock system information. In the embodiment of FIG. 6, Wi-Fi module 670 communicates smart wheel chock system information directly with any suitable computer 674 having a Wi-Fi module to directly receive smart wheel chock system information from Wi-Fi module 670.

Figure 7:
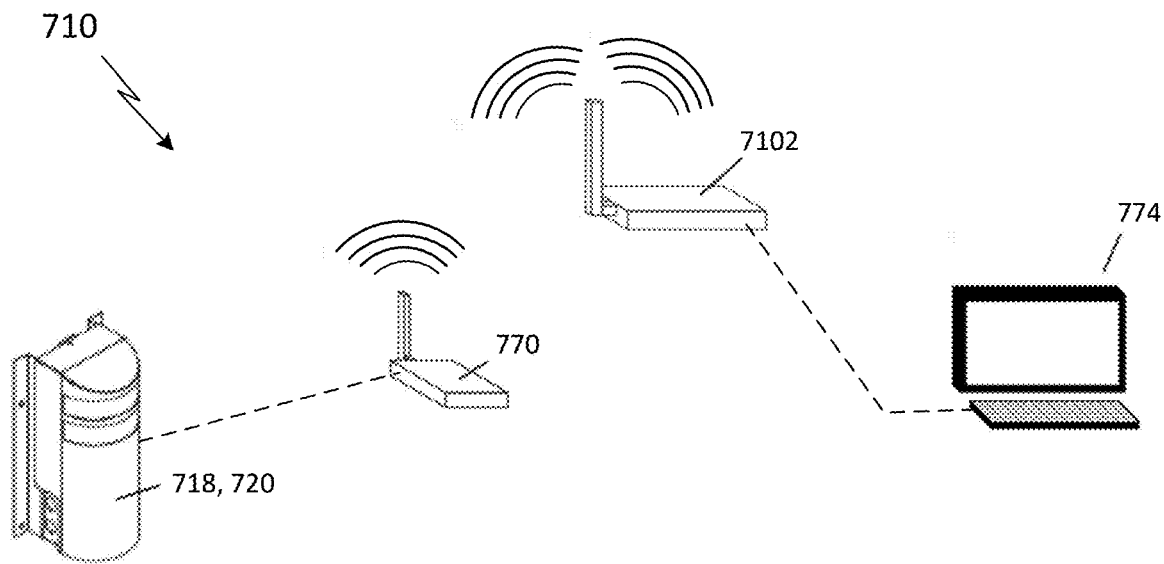
FIG. 7 depicts a block diagram of an exemplary Wi-Fi smart wheel chock system configuration where a computer cabled to a Wi-Fi access point can communicate via an access point with a smart wheel chock system.

FIG. 7 depicts a block diagram of an exemplary Wi-Fi smart wheel chock system 710 configuration where a computer cabled to a Wi-Fi access point can communicate via an access point to receive smart wheel chock system information. In the embodiment of FIG. 7, Wi-Fi module 770 communicates smart wheel chock system information via a local Wi-Fi network wireless point, such as, for example Wi-Fi wireless access point 7102. Any suitable computer 774 wired directly to the wireless access point 7102 can communicate via the access point to receive smart wheel chock system information from Wi-Fi module 770.

Figure 8:
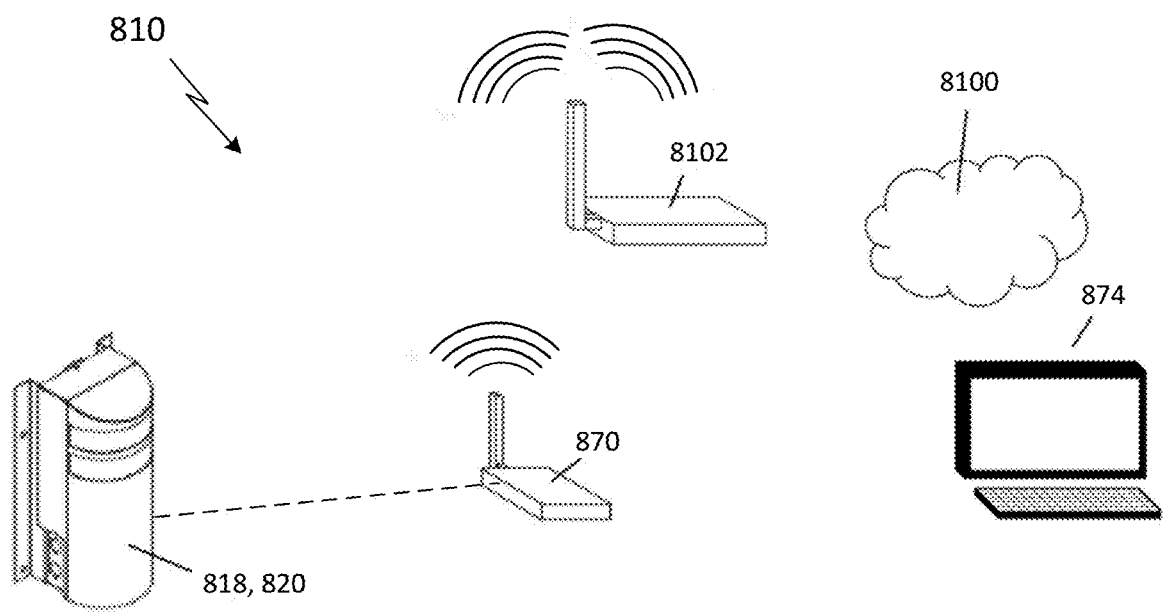
FIG. 8 depicts a block diagram of an exemplary Wi-Fi smart wheel chock system configuration where a computer with an internet connection can communicate via an access point with a smart wheel chock system.

FIG. 8 depicts a block diagram of an exemplary Wi-Fi smart wheel chock system 810 configuration where a computer with an internet connection can communicate via an access point to receive smart wheel chock system information. In the embodiment of FIG. 8, Wi-Fi module 870 communicates smart wheel chock system information via a local Wi-Fi network wireless point, such as, for example Wi-Fi wireless access point 8102. Any suitable computer 874 connected to the Internet 8100 can communicate via Wi-Fi access point 8102 via the Internet to receive smart wheel chock system information from Wi-Fi module 870.

Figure 9:
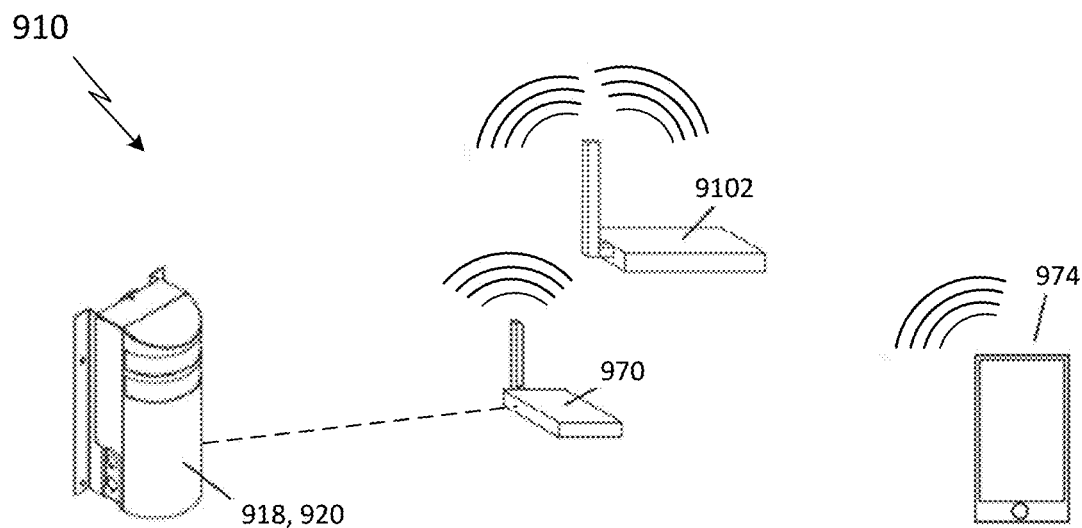
FIG. 9 depicts a block diagram of an exemplary Wi-Fi smart wheel chock system configuration where a wireless device with a Wi-Fi connection to a local Wi-Fi network can communicate via an access point with a smart wheel chock system.

FIG. 9 shows a block diagram of an exemplary Wi-Fi smart wheel chock system 910 configuration where a wireless device with a Wi-Fi connection to a local Wi-Fi network can communicate via an access point to receive smart wheel chock system information. In the embodiment of FIG. 9, Wi-Fi module 970 communicates smart wheel chock system information via a local Wi-Fi network wireless point, such as, for example Wi-Fi wireless access point 9102. Any suitable wireless device, such as mobile device 974, which can access the local Wi-Fi network, such as, for example by a Wi-Fi access point 9102, can communicate via Wi-Fi access point to receive smart wheel chock system information from Wi-Fi module 970.

Figure 10:
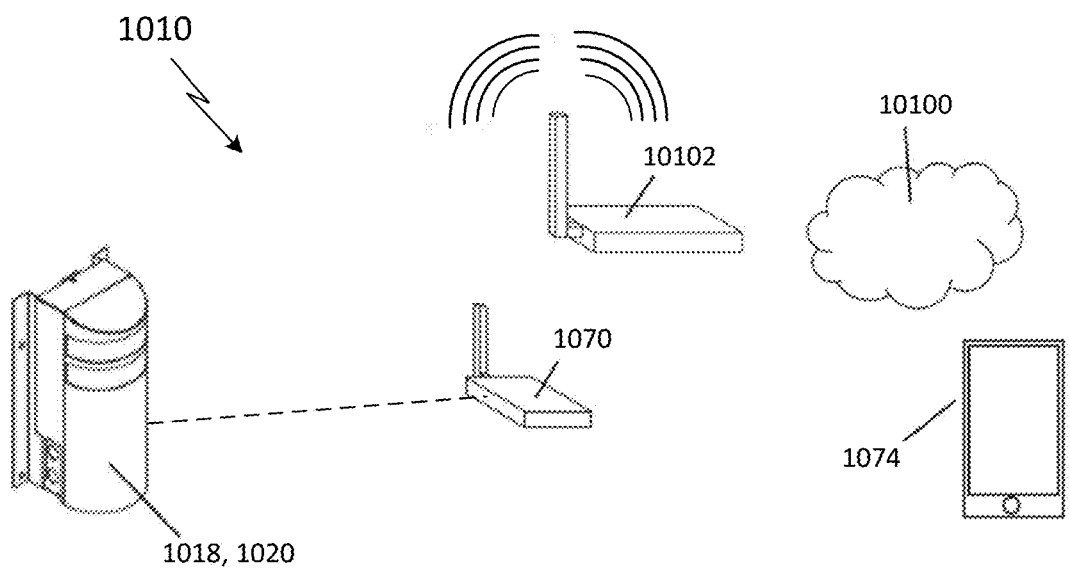
FIG. 10 depicts a block diagram of an exemplary Wi-Fi smart wheel chock system configuration where a wireless device with an Internet connection to a local Wi-Fi network can communicate via an access point with a smart wheel chock system.

FIG. 10 shows a block diagram of an exemplary Wi-Fi smart wheel chock system 1010 configuration where a wireless device with an Internet connection to a local Wi-Fi network can communicate via an access point to receive smart wheel chock system information. In the embodiment of FIG. 10, Wi-Fi module 1070 communicates smart wheel chock system information via a local Wi-Fi network wireless point, such as, for example Wi-Fi wireless access point 10102. Any suitable wireless device, such as mobile device 1074, which can access the Internet 10100 can communicate via Wi-Fi access point 10102 via the Internet to receive smart wheel chock system information from Wi-Fi module 1070.

Wired Embodiments: There may be installations where it is preferable to create the equivalent of the wireless network connections described in detail herein above in part or in whole by wired cables (e.g., a network of loading dock systems wired to one or more central computers or network hubs by a plurality of RS-485 cables). It is contemplated that such hardwired systems might be advantageous in commercial or factory settings with severe radio frequency interference (RFI) or severe electromagnetic interference (EMI) at or near the loading dock controllers. For hardware cabled networks of loading dock controllers, there can be dedicated controllers with any suitable form of digital outputs, such as, for example, digital line drivers to drive hardwired cables in particularly electrically noisy environments. There can also be embodiments with both wireless connectivity and hardwired options available on the same controller board. There can also be embodiments with optional plug-in modules for either wireless connectivity or hardwired options (e.g., a cable line driver module) available on the same controller board. The exact physical configuration of wired or wireless electronic circuitry provided on or near a controller board (e.g., provided as a separate module, separate package, or as components mounted on or near the controller) which provides either wired or wireless connectivity for a network of loading dock controllers is unimportant to the new system and method of networking one or more loading dock controllers at a facility.

In some embodiments, using any of the communication methods described hereinabove, in addition to receiving smart wheel chock system information, there can be two-way communication between a remotely controlled component (e.g., some component of the building HVAC system near the loading dock such as a fan or adjustable vane) or a person at a remote computer or mobile device. For example in some embodiments, a fan commanded off can automatically reply that the fan is off. Or, in some embodiments a person at a remote computer can send a message that can be displayed on a display at the loading dock.

The wheel chock system 10 may also include a LCD display 72 that can display smart wheel chock system information. In some embodiments, the display can show a data log of events which occurred over a particular time period to a local user at the loading dock. Typically, any data such as data regarding smart wheel chock operation, loading door operation and data entered into, or displayed by a local display (e.g., a local LCD display) can also be transmitted to the network via any suitable wireless means, such as by a Wi-Fi module.

In some embodiments, a user can input an identification tag, such as, for example, a PIN, a name, a signature, or a code (e.g., a barcode in a NFC, QR, or other format) that can be stored or transmitted. Once one or more IDs have been entered into a smart wheel chock system, there can be one or more levels of authorized use by the one or more IDs. For example, there can be one or more of the stored IDs authorized to operate the loading dock including loading dock operations that can be interlocked by a smart wheel chock system, such as, for example, the door leveler or door opener functions.

It was realized that in some loading dock situations, yet another or different level of safety review can be used or is needed to ensure proper chock placement against the tire of a truck or trailer wheel. A camera can be mounted in or near the outside light box (e.g., in a typical camera weather resistant housing), or inside a building or loading dock where there is a view of the outside loading dock and the tire of a truck or trailer wheel, such as through a window or camera view port. The camera can be used to confirm that the chock has been placed properly. The camera can send an image by any suitable digital or analog means to a smart wheel chock system at the loading dock. In some embodiments, where there is a local smart wheel chock system display (typically a LCD display), the wheel/chock image can display directly on the local display for the operator of the loading dock door to visually approve the wheel chock placement before operating the loading dock door and door leveler. In wireless embodiments, the image can also be sent out wirelessly (e.g., over a network) for additional review by another person such as a supervisor to review. In some embodiments, the image from the camera can be sent via a RS-232 converter to the wireless module which then sends the image data from the Wi-Fi module to the network.

It is contemplated that in some embodiments, an image recognition process running on a processor of the controller or on another computer can be used to automatically indicate if the chock is properly and safely positioned against the tire of the truck or trailer wheel based on the image of the truck or trailer wheel and the chock.

It is contemplated that an image recognition process can be adapted to automatically detect proper chock placement, such as, for example, to detect when a chock is making proper contact with a truck or trailer tire. Any suitable feature of an image of the tire and/or chock can be used. For example, it is contemplated that taking into account camera viewing angle and camera distance from the chock and tire, it can be possible to program a process that can outline the tire and chock and determine the relationships between the outline of the tire and an outline of the chock, and to calculate if the chock is in contact with the tire. For example, the process can consider dimensions such as the spacing between the edge of the chock and the edge of the tire at one or more points along the tire and/or along a surface of the wheel chock. In some embodiments, there can also be motion detection process where if the tire is detected to have any motion, the routine assumes the chock is not correctly preventing tire movement and sounds an alarm and/or activates a loading dock equipment interlock. There can be a threshold of motion detection, where for example, a strong wind might cause some limited trailer rocking motion. There can also be chock placement detection based an absence of a chock in the image, where, for example, when properly placed, the chock is mostly or entirely obscured by the tire. Any suitable image recognition parameters can be used for an image recognition process to find the tire and/or chock in an image, such as to identify a boundary line or outline of the tire and/or chock. For example, the image recognition routine can use parameters, such as, for example, colors, shapes, or any other suitable features of the truck or trailer wheel and/or the wheel chock. Objects can be intentionally color coded or marked with position or boundary marks (human eye visible or not) that can show in the image. For example, in some embodiments, the chock handle shaft is colored yellow and an unfinished chock can appear to be a metallic grey on a color image of the wheel chock assembly.

Figure 11:
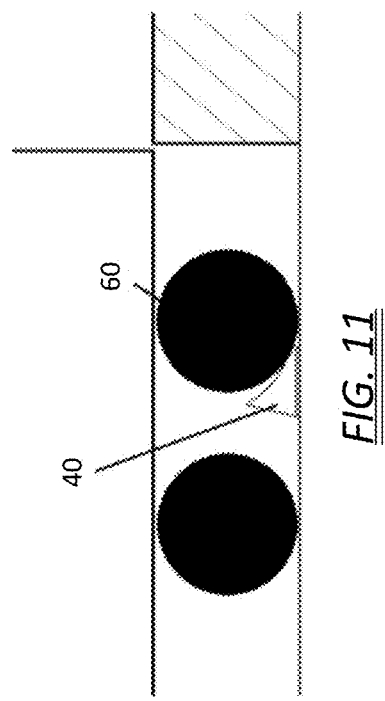
FIG. 11 depicts a simplified illustration of a properly chocked trailer tire.
Figure 12:
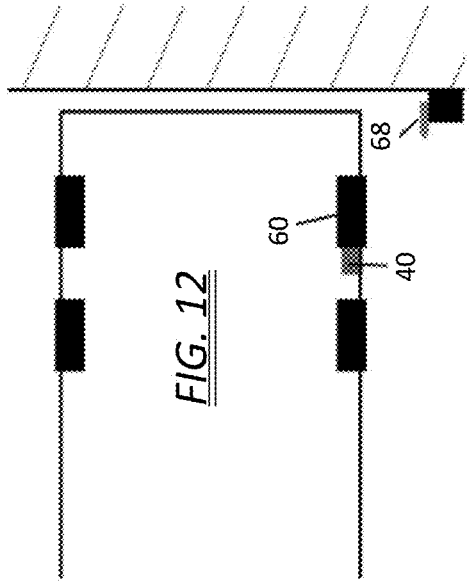
FIG. 12 depicts an overhead view of the illustration of FIG. 11.
Figure 13:
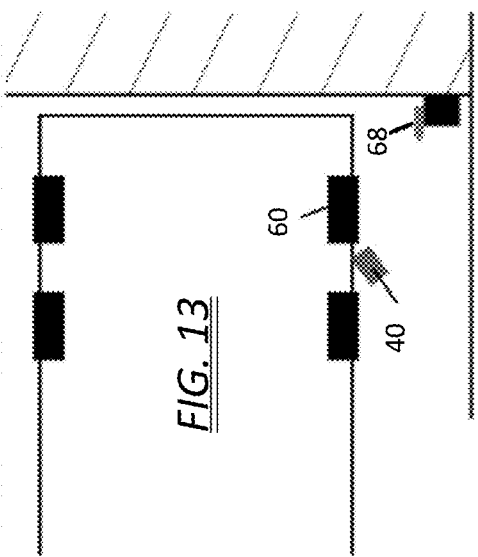
FIG. 13 depicts a simplified overhead exemplary illustration of an incorrectly placed chock.
Figure 14:
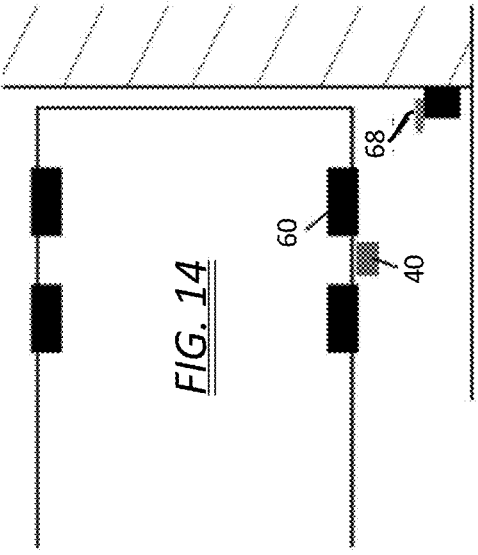
FIG. 14 depicts another simplified overhead illustration of an incorrectly placed chock.

FIG. 11 depicts a simplified illustration of a properly chocked trailer tire. FIG. 12 is an overhead view of the illustration of FIG. 11 that shows one possible location for an outside loading dock camera 68 with a wide enough field of view to view the tire and/or chock. The camera 68 can be mounted in any suitable position to view the truck or trailer wheel 60 and the wheel chock 40. The camera 68 can also be more directly aimed at an angle towards the expected location of the truck or trailer tire to be chocked. It is unimportant whether the camera 68 is mounted below, near, or above the expected tire/chock location as long as it can view the chocked truck or trailer tire. FIG. 13 shows a simplified overhead illustration of an incorrectly placed chock. FIG. 14 shows a simplified overhead illustration of another incorrectly placed chock. All three situations of FIG. 11, FIG. 12, FIG. 13, and FIG. 14 can be viewed an interpreted by either by a person viewing the image on a display at the loading dock, persons at one or more remote locations, and/or by an image recognition process adapted to identify wheel chock placement. While ideally the camera is fixed-mounted to avoid the need for operator intervention, the camera can also be mounted on a remote controlled positioning mount. Such a mount can allow a local or remote operator to view other parts of the loading dock. Also, it is contemplated that in some embodiments, an image recognition process as described hereinabove could also move the camera (e.g., fine tune the camera position) to find the wheel and/or the chock if one or both are not already in the image.

A software, firmware, and/or hardware signal and/or contact operation derived from the result of image recognition of safe chock placement can be used to interlock loading dock operations such as opening the loading dock door or operating the loading dock leveler. The result of such image processing of the wheel and chock image can be any suitable wheel chock placement safe/unsafe indication and/or any suitable interlocking functions. For example, there can be an interlock programmed into the controller code (e.g., controller firmware or software) to prevent certain loading dock operations by software control based on the image processing of the image of the wheel and chock. There can also be any suitable digital indication of proper chock placement based on the image processing of the image of the wheel and chock, such as, for example a digital "0" or "1" bit in data which can also be translated to an electrical level and/or a solid state switch status and/or an electrical contact operation (e.g., for hardware interlock purposes, such as, for example, to interlock AC power to a particular device such as a door motor and/or the leveler motor).

In some embodiments, a LCD panel, such as, for example a LCD display on the inside control panel and light box (not shown in the figures) can provide persons near the loading dock within the building truck chocking information from the smart wheel chock system, such as an image from an outside camera pointed in the vicinity of the rear trailer wheels and chock.

For example, a truck driver deems it unnecessary to properly chock the truck. The driver cheats the chock sensor such as by intentionally placing an item, such as a wallet, over the sensor aperture in the chock. Or, the chock may have been improperly placed under the tire (well enough to trigger the sensor, however unfortunately not well enough to be deemed proper chock placement) by an otherwise well intentioned, but hurried driver. A person at the loading dock viewing the wheel and chock, such as via a LCD display or through the Wi-Fi system on a mobile device can see that the wheel chock has not be properly placed for safe loading dock operation. In the case of a local loading dock operator, the operator refuses to proceed with operation of the loading dock based on the improper or unsafe placement of the wheel chock. In the case of a supervisor viewing the image on a mobile device or on a remote computer, in some embodiments, the supervisor can send a signal to freeze (e.g., by interlocking one or more loading dock electrical components) the operation of the loading dock, such as for example by an application running on the mobile device or remote computer. In other cases, the supervisor can order a halt to loading dock operations by intercom, by walking over to the loading dock, or by calling the operator of the loading dock, or by sending a message which is displayed on the local LCD.

It is contemplated that such supervisory functions can also be accomplished by computer image processing of the image of the wheel and chock. In such an automated supervisory role, the result of the image recognition of an improper chock placement can inhibit or interlock loading dock operations until the image shows a correct chock placement. In such automated image processing installations, there can also be alarms sent by the wireless module, such as by Wi-Fi, from the smart wheel chock system notifying others by network connection that loading dock operation was attempted with an improper wheel chock placement.

It will be appreciated by those skilled in the art that other notification means can also be used. For example, it is contemplated that a Wi-Fi smart wheel chock system can also send text messages, send email notifications, and/or make phone calls to announce an alarm condition.

While the network of loading dock controllers has been described hereinabove with respect to embodiments of smart wheel chock systems, there can also be loading dock safety systems which similarly incorporate an outside light box, and inside light box, and a controller which can be used independently of a wheel chock or wheel chock assembly (e.g., without a smart wheel chock by design, or where there is a broken or severed wheel chock assembly). Such loading dock safety systems can provides safety signaling of all of the signaling types described hereinabove (e.g., lights, audio alarms, and network based messaging and alarms) based on other loading dock parameters. For example, such a safety system might use a subset of the safety related parameters used by a smart wheel chock system, including loading dock door position and/or movement, safety chain across the loading dock opening in place or open, etc. There can also be additional sensors of any suitable type. For example, even in the absence of a smart chock assembly, there can still be a camera with a view of a truck or trailer wheel that can manually (e.g., by operator observation) or automatically (e.g., by controller or any other suitable computer) image recognition identify the presence of a truck or trailer wheel or tire at the loading dock. Or, where a conventional (not smart) wheel chock is present for use by a truck driver arriving at the loading dock, any of the imaging methods described hereinabove can be used. Any such safety systems can be networked using any of the techniques described hereinabove with respect to smart wheel chock embodiments.

A microcomputer is understood to include a microcontroller, a microprocessor, or any suitable device configured to perform the functions of a microcomputer, such as, for example, an application specific IC (ASIC) or field programmable gate array (FPGA). The controller functions can also be performed by any suitable computer, such as, for example by a notebook, desktop, or netbook computer.

Any suitable computer device can interact with a wireless smart wheel chock system. For example, a Wi-Fi wireless smart wheel chock system can interact with any suitable network connected computer or mobile device, such as, for example, a desktop computer, notebook computer, a netbook computer, a laptop computer, a tablet computer, or a smart phone. A standard telephone or cell phone can suffice the case of automated calls alarms from a smart wheel chock system.

Firmware or software running on the microcomputer of the controller or on another computer (e.g., image processing or alarm indications) is typically supplied on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A wheel chock system for a vehicle tire, comprising:
    a wheel chock assembly comprising a wheel chock and a sensor, the sensor disposed proximate the wheel chock to sense proximity to the vehicle tire;
    a controller communicatively coupled to the wheel chock sensor, the controller comprising
        a processor programmed to execute control instructions to one or more loading dock safety devices in response to a first set of pre-set conditions being satisfied, and further programmed to execute interlock instructions in response to a second set of pre-set conditions being satisfied;
        an input/output (I/O) interface communicatively coupled to the one or more loading dock safety devices for receiving loading dock system data; and
        a data storage device communicatively coupled with the processor for storing the loading dock system data;
    a wireless module communicatively coupled to the controller to convey the loading dock system data; and
    a local wireless access point communicatively coupled to the controller to wirelessly convey the loading dock system data to a computer or like mobile device.

2. The wheel chock system of claim 1, further comprising an outside light box operatively coupled to the sensor of the wheel chock assembly, the outside light box comprising one or more lamps configured to provide a visual indication in response to the sensor detecting the wheel chock being in close proximity to the vehicle tire.

3. The wheel chock system of claim 2, further comprising an inside control panel operatively coupled to the outside light box, the inside control panel comprising one or more lights configured to provide a visual safety status of a loading dock.

4. The wheel chock system of claim 3, wherein the controller is disposed within the inside control panel.

5. The wheel chock system of claim 3, wherein the processor is programmed to execute control instructions to change visual indications of both the outside light box and the inside control panel in response to the wheel chock sensor indicating a vehicle is properly chocked.

6. The wheel chock system of claim 1, wherein the wheel chock further comprises a convex surface for engaging the vehicle tire.

7. The wheel chock system of claim 6, wherein the convex surface of the wheel chock extends upwards from a base portion of the wheel chock.

8. The wheel chock system of claim 6, wherein the wheel chock further comprises a concave extension surface joined to an upper end of the convex surface.

9. The wheel chock system of claim 1, wherein the processor is programmed to execute interlock instructions in response to the wheel chock sensor indicating a vehicle is improperly chocked.

10. The wheel chock system of claim 9, wherein the interlock instructions comprise terminating AC power to a door motor.

11. The wheel chock system of claim 1, wherein the local wireless access point conveys the loading dock system data to a local area network to which the computer or like mobile device is connected.

12. The wheel chock system of claim 1, wherein the local wireless access point conveys the loading dock system data to the Internet, to which the computer or like mobile device is connected.

13. The wheel chock system of claim 1, wherein the wireless module comprises a Wi-Fi module.

14. The wheel chock system of claim 1, wherein a wireless technology of the wireless module is selected from the group consisting of ZigBee, XBee, power line communications (plc), and radio frequency (RF).

15. The wheel chock system of claim 1, wherein the sensor comprises an ultrasonic sensor.

16. The wheel chock system of claim 1, wherein the sensor is disposed within the wheel chock assembly.

17. The wheel chock system of claim 1, wherein the wheel chock assembly further comprises a shaft and a handle coupled to the wheel chock to facilitate placement of the wheel chock against the vehicle tire.

* * * * *